UNITED STATES PATENT OFFICE 2,612,434

ABSORBENT FOR PURIFYING AIR

Paul O. Rockwell and John C. Goshorn, Baltimore, Md., assignors to the United States of America as represented by the Secretary of War No Drawing. Application April 25, 1938,
Serial No. 204,156

9 Claims. (Cl. 23—4)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to an improved absorbent for purifying air to be breathed, and more particularly to an absorbent for completely removing certain harmful gases and vapors from the air, especially acid vapors.

The filters for gas masks must necessarily purify the air drawn therethrough at ordinary atmospheric temperatures, for example 0° to 110° F. Furthermore, the absorption of noxious vapors must be so complete that the vapors are physiologically undetectable. Many purifying agents which can be satisfactorily used in industrial processes are rendered unsuitable for gas mask filters, since they do not meet the above requirements.

Absorbents such as activated charcoal and soda lime have been used extensively in respirators. Activated charcoal is especially effective for absorbing organic vapors, and soda lime is used to take up acid vapors. A mixture of the two granules gave a balanced absorption mixture to protect against most noxious gases. It was later found that by impregnating the activated charcoal with the alkali contained in the soda lime or with hexamethylenetetramine or a metal oxide that the absorption of acid vapors could be distinctly improved.

The present invention is a further step in the improvement of activated charcoal by impregnating the charcoal with salts of certain thio acids with or without other reactive compounds. These other reactive compounds are ones which improve the absorption of CNCl, HCN and $AsH_3$. These activated and impregnated charcoals completely absorb considerable amounts of acid gases such as cyanogen chloride and hydrocyanic acid, without seriously decreasing the absorptive capacity for water insoluble, non-reactive organic vapors such as chlorpicrin.

One object of this invention is to provide improved absorbents for gas mask canisters and similar devices for purifying air containing cyanogen chloride, hydrocyanic acid and non-reactive organic vapors, or mixtures thereof.

Another object is to provide an absorbent for gas mask canisters and similar devices which will absorb considerable amounts of and therefore will give balanced protection against vapors of hydrocyanic acid, cyanogen chloride, mustard gas, arsine, chlorine, phosgene, sulphur dioxide, hydrogen sulphide, chlorpicrin, organic vapors, etc.

Various other objects will be apparent from the following description and appended claims.

It has long been known that activated charcoal is a good absorbent for many gases and vapors. Furthermore, activated charcoal has been impregnated with various agents to increase its absorptive capacity generally or for certain gases and vapors against which protection is desired.

According to the present invention, certain salts of the thio acids have been found especially effective as impregnants for activated charcoal to increase the absorption of such gases and vapors as cyanogen chloride. The thiosulfates, thioarsenites, thioarsenates, and thiocyanates may be used, the thiocyanates being preferred. The metal salts of the thio acids have given excellent results, especially those which are water-soluble such as the alkali metal and alkaline earth metal salts, sodium thiocyanate being preferred.

The activated charcoal of high quality such as that obtained from coconut shell of about 6–20 mesh size is soaked in a solution of 0.2% to 5% of the thio acid salt, drained, and dried to less than 5% moisture content by heating at 50° to 100° C.

Though the thio acid salts above described increase the absorption of activated charcoal of the gases and vapors, better results may be obtained if the charcoal is also impregnated with a strong base such as one having a pH of at least 11 in N/10 solution. The odorless non-volatile alkalies such as the carbonates or hydroxides of sodium and potassium are preferred. If volatile and odorous alkalies are used, such as ammonium hydroxide, only very small amounts should be used. The alkali may be added to the thio acid salt prior to soaking the charcoal. The solution should contain about 3 to 7% non-volatile alkali preferably about 5%, the procedure in draining and drying being as above given.

One principal object of this invention is to provide a charcoal having balanced protection against war gases, and including cyanogen chloride and hydrocyanic acid, and this may be obtained with approximately 0.5% to 1.0% thio acid salt and 5% alkali. If, however, a charcoal which is particularly effective against cyanogen chloride is desired, the amount of the thio acid salt may be increased and the alkali reduced. For example, activated charcoal impregnated with 4% NaCNS and 2% $Na_2CO_3$ gives excellent protection against cyanogen chloride, but slightly less protection against hydrocyanic acid.

It will be understood that the invention is not limited to the use of an alkali with the thio acid salts, since a marked increase in the absorption of cyanogen chloride and hydrocyanic acid is obtained when the whetlerite is impregnated with 0.5% to 3% thiocyanate without any alkali. However, markedly better results are obtained when about 5% NaOH or other water soluble alkali is used in addition to the thio acid salt.

It has long been known that activated charcoal impregnated with certain metals and/or their oxides gives increased absorption. This impregnated charcoal is known as whetlerite. It has been found that the novel impregnants of this invention may be advantageously used with these metals and/or oxides to still further increase the absorption of the whetlerite. The preferred metal is copper, but nickel, iron, cobalt, or silver may be used.

The metal may be impregnated into the charcoal by soaking in a solution of the metal salt. The metal and/or its oxide may be impregnated into the charcoal with the salt of thio acid, but better results are obtained if the charcoal is first impregnated with the metal and/or its oxide and later impregnated with the thio acid salt. For example, the charcoal may be soaked in a solution of a copper salt, such as the nitrate or sulfate, and the salt decomposed by heat; or soaked in an aqueous solution of ammonia, carbon dioxide and copper, heated to decompose the ammoniacal solution with the liberation of ammonia, carbon dioxide and water. Although this invention is not limited thereto, we prefer to incorporate about 3 to 8% of the metal and/or its oxide.

Further improvement in absorption of the activated charcoal may be obtained by the addition of a water soluble alkali to the charcoal impregnated with a metal and/or its oxide and the salt of thio acid. For example, the preferred embodiment of this invention comprises 6–20 mesh activated charcoal first impregnated with 3 to 8% of a metal and/or its oxide, preferably copper. After this initial impregnation, the charcoal is impregnated with 0.5% to 1.0% solution of sodium thiocyanate containing about 5% of the carbonates or hydroxides of sodium or potassium.

After impregnation, the charcoal is preferably dried by heating to contain less than 5% moisture. The total of the impregnants remaining in the activated charcoal should be such that the charcoal retains a considerable portion of its original adsorptive powder for chlorpicrin.

It will be understood that the absorption of the charcoal impregnated with the thio acid salts is improved by the addition of the alkalies whether or not copper, iron, nickel, cobalt or silver are also present in the charcoal.

Ammonium thiocyanate and its isomer, thiourea, are equivalents in this invention.

The marked improvement in cyanogen chloride and hydrocyanic acid absorption obtained by the novel impregnants herein described is obtained against concentrations normally encountered in chemical warfare, that is, less than 5000 parts per million.

Activated charcoal impregnated as herein described gives excellent protection against all known war gases, including cyanogen chloride and hydrocyanic acid. Furthermore, such charcoal may be stored for long periods of time without material depreciation in absorptive capacity and may be used later in gas mask canisters without giving off harmful or irritant odors.

It will be understood that the invention is not limited to the details herein given by way of illustration, since various changes may be made therein by those skilled in the art without departing from the spirit of the invention nor exceeding the scope of the claims.

We claim:

1. A process for removing hydrocyanic acid and cyanogen chloride from air to be breathed which consists in the passing of air through an activated charcoal impregnated with a water soluble salt of thiocyanic acid.

2. A process for removing hydrocyanic acid from air to be breathed which consists in the passing of air through an activated charcoal base impregnated with a water soluble metal salt of thiocyanic acid, said base being from the charcoal group consisting of activated charcoal and charcoal impregnated with copper and copper oxide.

3. A process for removing cyanogen chloride from air to be breathed which consists in the passing of air through an activated charcoal base impregnated with a water soluble metal salt of thiocyanic acid, said base being from a charcoal group consisting of activated charcoal and charcoal impregnated with nickel and nickel oxide.

4. A process for removing cyanogen chloride from air to be breathed which consists in the passing of air through an activated charcoal base impregnated with a water soluble metal salt substance consisting of thiocyanic acid, said base being from a charcoal group consisting of activated charcoal and charcoal impregnated with iron and iron oxide.

5. A process for removing cyanogen chloride from air to be breathed which consists in the passing of air through an activated charcoal base impregnated with a water soluble metal salt of thiocyanic acid, said base being from a charcoal group consisting of activated charcoal and charcoal impregnated with a substance from a group consisting of the metals and oxides of copper, nickel and mixtures thereof.

6. A process for removing cyanogen chloride from air to be breathed which consists in the passing of air through an activated charcoal base impregnated with a water soluble metal salt of thiocyanic acid, said base consisting of charcoal impregnated with copper and copper oxide.

7. A process for removing cyanogen chloride from air to be breathed which consists in the passing of air through an activated charcoal base impregnated with a water soluble metal salt of thiocyanic acid, said base consisting of charcoal impregnated with nickel and nickel oxide.

8. A process for removing cyanogen chloride from air to be breathed which consists in the passing of air through an activated charcoal base impregnated with a water soluble metal salt of thiocyanic acid, said base consisting of charcoal impregnated with iron and iron oxide.

9. A process for completely removing hydrocyanic acid and cyanogen chloride from air to be breathed which consists in passing air through activated charcoal impregnated with, by weight, 3% to 8% copper, 0.5% to 1% potassium thiocyanate, and 5% sodium hydroxide.

PAUL O. ROCKWELL.
JOHN C. GOSHORN.

REFERENCES CITED

The following references are of record in the file of this patent:

UNITED STATES PATENTS

| Number | Name | Date |
|---|---|---|
| 1,719,762 | Gollmar | July 2, 1929 |
| 1,781,664 | Rockwell | Nov. 11, 1930 |
| 2,056,854 | Hene | Oct. 6, 1936 |
| 2,175,190 | Goshorn | Oct. 10, 1939 |